(12) United States Patent
Lu et al.

(10) Patent No.: US 8,435,382 B2
(45) Date of Patent: May 7, 2013

(54) HIGH SOLIDS GLYOXALATED POLYACRYLAMIDE

(75) Inventors: Chen Lu, Memphis, TN (US); James Andrew Ward, Eads, TN (US)

(73) Assignee: Buckman Laboratories International, Inc., Memphis, TN (US)

( * ) Notice: Subject to any disclaimer, the term of this patent is extended or adjusted under 35 U.S.C. 154(b) by 906 days.

(21) Appl. No.: 12/138,766

(22) Filed: Jun. 13, 2008

(65) Prior Publication Data

US 2008/0308242 A1 Dec. 18, 2008

Related U.S. Application Data

(60) Provisional application No. 60/944,195, filed on Jun. 15, 2007.

(51) Int. Cl.
*D21H 17/50* (2006.01)
*D21H 23/04* (2006.01)
*C08F 220/56* (2006.01)
*C08G 69/48* (2006.01)

(52) U.S. Cl.
USPC ............ 162/168.3; 162/158; 162/164.1; 162/164.6; 162/166; 162/168.1; 162/185; 525/154; 525/329.4; 525/383; 526/307.3; 526/312; 528/245; 528/422; 528/493

(58) Field of Classification Search .............. 162/158, 162/164.1, 164.6, 166, 168.3, 185, 168.1, 162/168.2; 525/55, 329.4, 154, 383; 526/303.1, 526/307.3, 310, 312; 528/230, 245, 422, 528/493
See application file for complete search history.

(56) References Cited

U.S. PATENT DOCUMENTS

| | | | |
|---|---|---|---|
| 3,556,932 A | 1/1971 | Coscia et al. | |
| 4,605,702 A | 8/1986 | Guerro et al. | |
| 4,954,538 A | 9/1990 | Dauplaise et al. | |
| 6,488,812 B2 * | 12/2002 | Shannon et al. | 162/164.6 |
| 6,696,067 B2 * | 2/2004 | Brandt et al. | 424/401 |
| 2004/0163785 A1 * | 8/2004 | Shannon et al. | 162/158 |
| 2005/0161181 A1 * | 7/2005 | St. John et al. | 162/158 |
| 2006/0142535 A1 * | 6/2006 | Cyr et al. | 528/230 |

FOREIGN PATENT DOCUMENTS

| | | |
|---|---|---|
| JP | 56157403 | 12/1981 |
| WO | 2005072185 A2 | 8/2005 |
| WO | 2006068964 A2 | 6/2006 |

OTHER PUBLICATIONS

International Search Report and Written Opinion of the International Searching Authority for corresponding International Patent Application No. PCT/US2008/066873 dated Dec. 10, 2008 (14 pages).

* cited by examiner

*Primary Examiner* — Mark Halpern
*Assistant Examiner* — Dennis Cordray
(74) *Attorney, Agent, or Firm* — Kilyk & Bowersox, P.L.L.C.

(57) ABSTRACT

Storage-stable glyoxalated polyacrylamide polymers and high solids aqueous compositions formulated with them are described. These glyoxalated polyacrylamide compositions can be used as additives for papermaking, providing paper with good dry and temporary wet strength, and increasing papermaking de-watering rates.

22 Claims, 5 Drawing Sheets

HIGH SOLIDS GLYOXALATED POLYACRYLAMIDE

This application claims the benefit under 35 U.S.C. §119 (e) of prior U.S. Provisional Patent Application No. 60/944,195, filed Jun. 15, 2007, which is incorporated in its entirety by reference herein.

BACKGROUND OF THE INVENTION

The present invention relates to storage-stable glyoxalated polyacrylamide, high solids aqueous compositions thereof, and their use for papermaking.

Glyoxalated polyacrylamide (G-PAM) is used in a variety of paper grades to provide paper with dry and temporary wet strength. For example, glyoxalated polyacrylamide increases the initial wet strength of many household tissues which come in contact with water in use. Glyoxalated polyacrylamide is also applied to increase the compression strength and the dimensional stability of many board-grade paper products.

Glyoxalated polyacrylamide generally has been prepared by reacting glyoxal with a cationic polyacrylamide in slightly alkaline aqueous solution and stabilized under acidic condition. Commercially available glyoxalated polyacrylamide products contain a large number of un-reacted amide groups, which can react with glyoxal under storage, leading to the continuing cross-linking of the base polyacrylamide molecules and shortened product shelf life. Also, in practice, the polyacrylamides have contained relatively low amounts of cationic monomer, and typically below about 5 mole percent thereof, limiting the cationic charge contribution of this component.

Glyoxalated polyacrylamide generally can not be dried into a solid particulate form without inducing significant and rapid crosslinking of the glyoxalated polyacrylamide. Glyoxalated polyacrylamide is thus typically stored and transported in a bulk aqueous fluid carrier. The volumes of formulated glyoxalated polyacrylamide transported in this manner can be significant, which can require large volume containers or tanker vessels for transport. Under storage in bulk aqueous fluid, glyoxal still tends to continue cross-linking the base polyacrylamide molecules in prior formulations, ultimately resulting in solution gelling and the loss of performance. To provide glyoxalated polyacrylamide with ample storage stability, commercially available glyoxalated polyacrylamide products ordinarily have been prepared in a dilute concentration of about 7.5%, giving a shelf life of about 24 days. It has been reported that 10% glyoxalated polyacrylamide solutions gel within 8 days at 25° C., and that 7.5% glyoxalated polyacrylamide solutions gel within 24 days at 25° C., such as disclosed by Farley, C., Chapter 3—Glyoxalated Polyacrylamide Resin, in Wet-Strength Resins and Their Applications, Tappi Press, 1994. Further, these storage periods were indicated to be reduced 50% where the storage temperature was increased from 25° C. to 30° C. For the past few decades, researchers have devoted considerable efforts to reducing manufacturing and shipping costs of glyoxalated polyacrylamides. However, reported prior methods have either significantly increased cost or gave poor wet/dry strength performance in paper.

U.S. Pat. No. 3,556,932 relates to glyoxalated polyacrylamide that can be prepared by reacting glyoxal with a cationic polyacrylamide under slightly alkaline conditions. The cationic polyacrylamide (base polymer) has a molecular weight of 7000-25,000 Daltons. The cationic charge is obtained by copolymerizing acrylamide with a cationic monomer, which is typically dimethyldiallylammonium chloride. The cationic monomer dimethyldiallylammonium chloride is exemplified in U.S. Pat. No. 3,556,932 as used in an amount of about 2 mole percent of the acrylamide-diallydimethyl ammonium chloride copolymer.

U.S. Pat. No. 4,605,702 relates to the preparation of glyoxalated polyacrylamide using a base polymer with a low molecular weight ranging from 500 Daltons to 6000 Daltons. The exemplified glyoxalated polyacrylamide products in U.S. Pat. No. 4,605,702 have a concentration of about 20% by weight cationic monomer, but were indicated as being used in much higher dosages to compare wet strength properties with exemplified products in U.S. Pat. No. 3,556,932.

U.S. Pat. No. 4,954,538 relates to the preparation of glyoxalated polyacrylamide microparticles with inverse microemulsion polymerization techniques using surfactants to isolate polymer molecules from each other. U.S. Pat. No. 4,954,538 indicates that commercial glyoxalated acrylamide polymers, supplied as 10% solids solutions, gel within about 8 days at room temperature.

U.S. Pat. No. 5,723,022 relates to compositions comprising a blend of (A) an ionic, water soluble, vinylamide polymer containing sufficient vinylamide and —CHOHCHO substituents to be thermosetting and a ratio of glyoxal substituents to glyoxal-reactive substituents in excess of about 0.02:1.0 and (B) a glyoxalated, cationic, water soluble vinylamide polymer having a molecular weight of about 500 to about 6000, sufficient glyoxal-reactive and glyoxal substituents to be thermosetting and a ratio of glyoxal substituents to vinylamide substituents being in an excess of about 0.1:1.0. A compound (A) is exemplified in U.S. Pat. No. 5,723,022 as containing about 5% by weight or about 2 mole % diallydimethyl ammonium dichloride.

U.S. Pat. Nos. 7,034,087 and 7,119,148 relate to methods for making a storage-stable glyoxalated polyacrylamide in which glyoxal is added to the base polymer in two portions and a scavenger for aldehyde groups is used.

U.S. Pat. No. 4,603,176 relates to temporary wet strength resin polymers comprising glyoxal-capped polyacrylamides including a polar, non-nucleophilic unit which does not cause the resin polymer to become water-insoluble, and a hydrophilic cationic unit which imparts a positive charge to the resin polymer, in certain prescribed molar percentages. These resins, when incorporated into paper products, are reported to provide good dry and initial wet tensile strength together with fast wet tensile decay.

Prior methods for making glyoxalated polyacrylamide products have tended to either increase cost significantly or give poor wet/dry strength performance. Commercial glyoxalated polyacrylamide products continue to be manufactured and shipped in the dilute concentration of 7.5 wt % or less. It would be desirable to increase the shelf life of these products without having to resort to further dilution of the polymer content in carrier solution and/or use cooling means to keep the product chilled during storage to retard gelling phenomenon. There has been an unmet need in the industry for cost-effective, storage stable, high solid glyoxalated polyacrylamide products that can meet performance expectations.

SUMMARY OF THE PRESENT INVENTION

A feature of the present teachings is to provide storage-stable, high solids glyoxalated polyacrylamide compositions.

A further feature of the present teachings is to provide storage-stable, high solids glyoxalated polyacrylamide polymers providing good dry and temporary wet strength in paper products that incorporate them.

A further feature of the present teachings is to provide storage-stable, high solids glyoxalated polyacrylamide polymers that increase papermaking de-watering rates.

An additional feature of the present teachings is to provide cost-effective processes for making storage-stable, high solids glyoxalated polyacrylamide compositions.

Additional features and advantages of the present invention will be set forth in part in the description that follows, and in part will be apparent from the description, or can be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates, in part, to glyoxalated polyacrylamide polymers containing at least about 25% by weight cationic monomer, and high solids aqueous compositions thereof that are storage-stable at high polymer concentrations, for example, about 10% by weight or more glyoxalated polyacrylamide polymer. These glyoxalated polyacrylamide compositions can be used, for example, as additives for papermaking, providing paper with good dry and temporary wet strength, and/or increasing papermaking de-watering rates.

In further various embodiments, a glyoxalated polyacrylamide polymer is provided that comprises from about 75% to about 10%, by weight, acrylamide monomer and from about 25% to about 90%, by weight, cationic monomer copolymerizable with the acrylamide monomer, and having sufficient glyoxal-reactive amide substituents and —CHOHCHO substituents to be thermosetting. In other further various embodiments, the glyoxalated acrylamide polymer comprises, for example, from about 70% to about 30%, by weight, acrylamide monomer and from about 30% to about 70%, by weight, cationic monomer, or, for example, from about 65% to about 50%, by weight, acrylamide monomer and from about 35% to about 50%, by weight, cationic monomer, or, for example, from about 62% to about 55%, by weight, acrylamide monomer and from about 38% to about 45%, by weight, cationic monomer.

In various embodiments of the glyoxalated polyacrylamide polymer of the present teachings, the cationic monomer can be 2-vinylpyridine, 2-vinyl-N-methylpyridinium chloride, (p-vinylphenyl)trimethyl ammonium chloride, diallyldimethylammonium chloride, 2-(dimethylamino)ethyl acrylate, trimethyl p-vinylbenzyl)ammonium chloride, p-dimethylaminoethylstyrene, dimethylaminopropyl acrylamide, 2-methylacroyloxyethyltrimethyl ammonium methylsulfate, or 3-acrylamido-3-methylbutyl trimethyl ammonium chloride, or any combination thereof. In various embodiments, the cationic monomer is diallyldimethyl ammonium chloride. In various embodiments, the acrylamide monomer can be replaced by other primary amide-containing monomers such as methacrylamide, ethylacrylamide, crotonamide, N-methyl acrylamide, N-butyl acrylamide, or N-ethyl methacrylamide, or any combination thereof. In various embodiments, the acrylamide monomer is acrylamide. In various embodiments, the glyoxalated polyacrylamide polymer can be the reaction product of glyoxal and a base polymer comprising the acrylamide monomer and the cationic monomer in a weight ratio, ranging, for example, from about 0.01 to about 0.6:1, and, for example, from about 0.10 to about 0.30:1. The base polymer can have a molecular weight ranging, for example, from about 500 Daltons to 100,000 Daltons, for example, 3,000 to 20,000 Daltons, for example, from about 3,000 Daltons to about 13,000 Daltons, or, for example, 5,000 Daltons to 9,000 Daltons.

Paper strength tends to deteriorate where the base polymer molecular weight is either too high or too low. In view of this consideration, an intermediate molecular weight, such as about 3,000 to about 13,000 Daltons, is preferred in various non-limiting embodiments of the present invention. Unless indicated otherwise, molecular weights are reported herein as weight average molecular weights.

In other various embodiments, an aqueous glyoxalated polyacrylamide polymer composition is provided comprising at least 10%, by weight, of the glyoxalated acrylamide polymer. In further various embodiments, the concentration of the glyoxalated acrylamide polymer in the aqueous medium can be from about 10% to about 30%, by weight, or, from about 11% to about 15%, by weight, or, from about 12% to about 15%, by weight, glyoxalated acrylamide polymer.

In various embodiments, the glyoxalated polyacrylamide polymer compositions of the present teachings have a viscosity of less than about 45 cps, or particularly less than 25 cps (e.g., 1 cps to 24 cps, or 5 cps to 20 cps, or 10 cps to 20 cps), as measured on a Brookfield viscometer using #2 spindle at 60 rpm after 14 days storage at 37° C. In other various embodiments, the glyoxalated acrylamide polymer composition has a viscosity of less than about 25 cps, as measured on a Brookfield viscometer using #2 spindle at 60 rpm (e.g., 1 cps to 24 cps, or 5 cps to 20 cps, or 10 cps to 20 cps) after 28 days storage at 37° C. These viscosity properties demonstrate the surprisingly good stability and storage properties of glyoxalated acrylamide polymer compositions of the present teachings at high polymer solids content levels that significantly exceed the norm in the industry. These improvements in storage stability can be obtained with the glyoxalated polyacrylamide polymer compositions according to the present teachings without the need to include, nor incur, the added costs of extraneous stabilizers, aldehyde scavengers, surfactants, and the like, although these materials are not categorically excluded. In various embodiments, the glyoxalated polyacrylamide polymer compositions of the present teachings can contain no stabilizer additives or are essentially free of them (that is, contain <0.1 wt % total stabilizers, aldehyde scavengers, and surfactants). Further, the higher charged glyoxalated acrylamide polymer according to the present teachings also can give comparable dry and wet strength performances as commercial 7.5% concentration glyoxalated acrylamide products. The ability to increase glyoxalated acrylamide polymer concentration in aqueous compositions by at least 2% by weight or more according to embodiments of the present teachings as compared to conventional practice, and without impairing storage stability or end-use performance, can translate into huge reductions in aggregate product volumes being transported and handled, such as, for example, where railway tanker car or tanker truck shipments and the like are involved, and thus significant savings in costs and handling can be obtained.

In various embodiments, a paper product is provided comprising the glyoxalated polyacrylamide polymer of the present teachings. In further various embodiments, a paper product is provided comprising recycled paper pulped with a glyoxalated polyacrylamide in an amount effective to provide a water drainage rate of less than about 45 seconds (e.g., 1 second to 44 seconds, 5 seconds to 40 seconds, 10 seconds to 30 seconds) for drainage of 550 mL through 60 mesh wire with a Mutek DFR-4 tester using a dosage of 7 pounds of the glyoxalated acrylamide polymer according to the present teachings per ton dry fiber. In other various embodiments, a product is provided comprising a paper layer containing the glyoxalated polyacrylamide polymer, wherein the product is selected, for example, from paper sheeting, paperboard, tissue paper, and wall board.

In other various embodiments, a process is provided for making paper which comprises absorbing an amount of the glyoxalated acrylamide polymer according to the present teachings on cellulose papermaking fibers in aqueous suspension, and forming the suspension into a water-laid web and drying the web, wherein the amount of glyoxalated acrylamide polymer is effective to increase at least one paper property, such as dry strength, wet strength, and/or de-water rate as compared to paper made with the suspension absent the glyoxalated acrylamide polymer. In various embodiments, the glyoxalated acrylamide polymer can be stably stored, for example, for at least about 28 days when stored at about 25° C., or, for example, for at least about 14 days when stored at about 37° C., or, for example, for at least about 28 days when stored at about 37° C., prior to its effective use in the absorbing step of a papermaking process. In various embodiments, the amount of glyoxalated polyacrylamide polymer added, on a solids basis, to paper can be from about 0.5 to about 12 pounds (lb.) polymer/ton dry fiber, or, for example, from about 3 to about 10 lb. polymer/ton dry fiber. The paper can comprise, for example, a cellulosic fibrous non-woven web.

In other various embodiments, a process is provided for making high solids glyoxalated polyacrylamide polymer compositions according to the present teachings having a concentration of the high charged polymer therein of at least about 10% by weight.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the embodiments of the present invention and together with the description, serve to explain the principles of the present invention.

DETAILED DESCRIPTION OF THE PRESENT INVENTION

Figure 1:
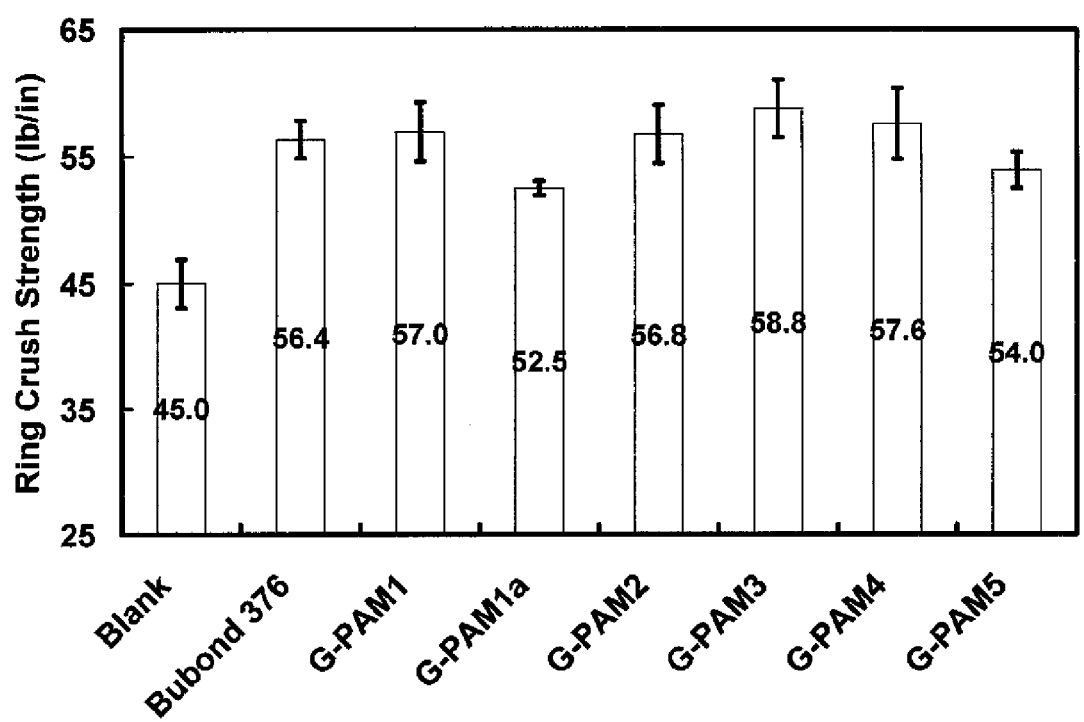
FIG. 1 illustrates results of a ring crush strength test conducted on handsheets treated with different glyoxalated polyacrylamide compositions containing different proportions of cationic monomer content in the base polymer and/or active content.

The present invention relates, in part, to glyoxalated polyacrylamide polymers containing at least about 25% by weight cationic monomer, which can be formulated into high solids, storage stable aqueous compositions that can contain about 10% by weight or more glyoxalated polyacrylamide polymer. The glyoxalated acrylamide compositions can be used, for example, as additives for papermaking, providing paper with good dry and temporary wet strength, and/or increasing papermaking de-watering rates.

The glyoxalated acrylamide polymer according to the present teachings can comprise, for example, from about 75% to about 10%, by weight, acrylamide monomer and from about 25% to about 90%, by weight, cationic monomer copolymerizable with the acrylamide monomer, and having sufficient glyoxal-reactive amide substituents and —CHOHCHO substituents to be thermosetting. In other further various embodiments, the glyoxalated acrylamide polymer comprises, for example, from about 70% to about 30%, by weight, acrylamide monomer and from about 30% to about 70%, by weight, cationic monomer, or, for example, from about 65% to about 50%, by weight, acrylamide monomer and from about 35% to about 50%, by weight, cationic monomer, or, for example, from about 62% to about 55%, by weight, acrylamide monomer and from about 38% to about 45%, by weight, cationic monomer.

In various embodiments, a storage-stable glyoxalated polyacrylamide polymer according to the present teachings can incorporate a base polymer resin having the following exemplary formula

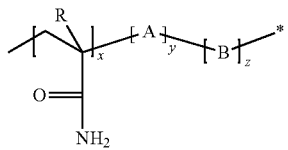

wherein R is H, $C_1$ alkyl, $C_2$ alkyl, $C_3$ alkyl, $C_4$ alkyl, or halogen; A is a cationic unit which imparts a charge to the resin polymer; B is an optional non-nucleophilic unit which does not react with glyoxal under aqueous condition; wherein the weight percent of x is from 75% to about 10%; the weight percent of y is from 25% to about 90%; the weight percent of z is from 0% to 65%; and the molecular weight of the base polymer resin is from 500 Daltons to 100,000 Daltons, or, for example, 3,000 Daltons to 20,000 Daltons, or, for example, 3,000 Daltons to 13,000 Daltons, or, for example, 5,000 Daltons to 9,000 Daltons.

These base polymer resins are glyoxalated to provide thermosetting resins that are particularly suitable for use as additives for papermaking, providing paper with good dry and temporary wet strength, and/or increasing papermaking de-watering rate. The glyoxalation of polyacrylamide according to an exemplary illustration is schematically indicated below.

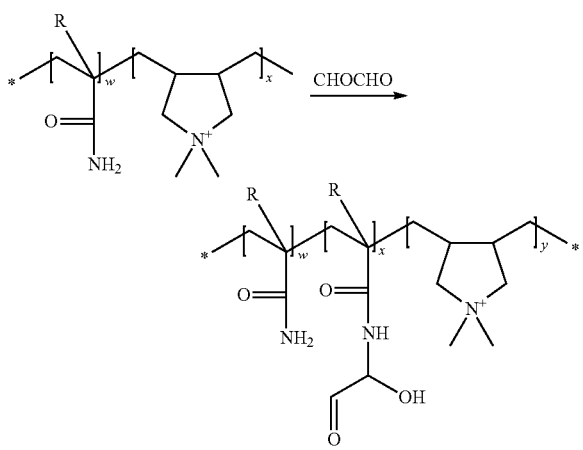

Glyoxal reacts with amide groups to form a pendant glyoxalated group. In addition, glyoxal cross-links the base polymer molecules at glyoxal-reactive amide substituents of the acrylamide units (not shown), leading to a thermosetting interpolymer and an associated increase of solution viscosity. The presence of high cationic monomer content in the resulting glyoxalated polyacrylamide polymers according to the present teachings reduces the amide content and/or the cross-linking rate. Thus, the product can be prepared at a higher solid content but with longer shelf life. This higher charged glyoxalated polyacrylamide resin also gives comparable wet/dry strength in paper as commercially available 7.5% glyoxalated polyacrylamide products. Higher de-watering rates during the papermaking process also can be obtained by treating pulps with glyoxalated polyacrylamide polymer products of the present teachings as compared to commercially available lower solids glyoxalated polyacrylamide polymer products.

Cationic monomers include, for example, 2-vinylpyridine, 2-vinyl-N-methylpyridinium chloride, (p-vinylphenyl)trimethyl ammonium chloride, diallyldimethylammonium chloride, 2-(dimethylamino)ethyl acrylate, trimethyl(p-vinylbenzyl)ammonium chloride, p-dimethylaminoethylstyrene, dimethylaminopropyl acrylamide, 2-methylacroyloxyethyltrimethyl ammonium methylsulfate, and 3-acrylamido-3-methylbutyl trimethyl ammonium chloride.

The acrylamide can be replaced by other primary amide-containing monomers such as methacrylamide, ethylacrylamide, crotonamide, N-methyl acrylamide, N-butyl acrylamide, N-ethyl methacrylamide and the like. Thus, polyacrylamides, which by definition are polymers made from acrylamide monomers, include repeating units from at least one or more of these various compounds.

The acrylamide monomer provides the primary reaction sites on the base polymer backbone to which the glyoxal substituents are attached. The base polymer must have a sufficient number of base acrylamide monomers in its structure (pendant amide groups) so that, once functionalized with glyoxal, the resulting polymer is thermosetting. As used herein, "thermosetting" and "crosslinking", and similar terms are intended to embrace the structural and/or morphological change that occurs, for example, by covalent chemical reaction or ionic interaction between separate molecules in a composition. Generally, the amount of base acrylamide monomer should be at least about 10 weight percent of the base polymer. Paper strengthening properties of the resulting polymer generally will increase with increased amounts of acrylamide content, although it has been found in the present invention that adequate wet strength properties can be provided in higher cationic monomer content polyacrylamide base polymers according to the present teachings, while dry strength is as good if not superior to comparable polymers with lower cationic monomer content. The base acrylamide monomer is normally provided in an amount of at least about 50 weight percent and sometimes in excess of 60 weight percent of the total vinyl monomers from which the base polyacrylamide is prepared.

In various embodiments, the base polymer optionally can also contain a non-nucleophilic monomer to reduce amide-glyoxal cross-linking reaction. The suitable non-nucleophilic monomers include vinyl acetate, N-vinylpyrrolidone, N,N-dimethylacrylamide, acrylonitrile, styrene, hydroxyl alkyl (meth)acrylates and the like. The weight percent of this non-nucleophilic unit can range from zero to 65 (e.g., 1 wt % to 80 wt %, 5 wt % to 70 wt %, 10 wt % to 60 wt %, 15 wt % to 50 wt %, 20 wt % to 40 wt % and so on).

The base polymer product of the copolymerization of the acrylamide monomer and cationic monomer for use in the present invention, or polyacrylamide base polymer, can be prepared by free radical polymerization in an aqueous system. Methods for making base polyacrylamide can be modified to practice the present teachings. To prepare a polyacrylamide base polymer of a desired chemical composition and monomer distribution, the full complement of the cationic monomer(s) and the non-nucleophilic monomer(s) can be added all at once at the beginning of the polyacrylamide polymerization reaction. Alternatively, the cationic monomer(s) and the non-nucleophilic monomer(s) can be added continuously along with acrylamide monomer over the time course of the polymerization reaction. Still other options for reacting the cationic monomers and the non-nucleophilic monomers with the acrylamide monomer will be recognized by those skilled in the art, such as sequentially, batch, semi-batch, and the like. Commonly used free radical initiators that can be used in the present invention include various peroxide, azo compounds, potassium and ammonium persulfates, and a redox initiator system. The polyacrylamide base polymer has a molecular weight ranging, for example, from 500 Daltons to 100,000 Daltons, for example, from 3,000 Daltons to 20,000 Daltons, for example, from 3,000 Daltons to 13,000 Daltons, for example, from 5,000 Daltons to 9,000 Daltons. The molecular weight can be influenced by changing the reaction temperature, the level of solids in the reaction, the amount of initiator, the amount of chain transfer agent, and by other methods used by those skilled in the art. The suitable chain transfer agents include isopropyl alcohol, mercaptans, sodium formate, and sodium acetate.

The so-prepared base polymer is then reacted with glyoxal, for instance, at a pH of 7 to 10. The weight ratio of the glyoxal to the base polymer ranges, for example, from about 0.01 to about 0.60:1, and for example, from about 0.10 to about 0.30:1, respectively. The reaction temperature can be maintained in the range of 15° C. to 50° C. A buffer can be added to control solution pH throughout the reaction. Suitable buffers include sodium phosphates, sodium pyrophosphate, borax, and Tris. Once the solution reaches a desired viscosity, dilute acid can be added to quench the reaction. The final pH of the solution can range from 2 to 5. Alternatively, either the glyoxal solution or the base polymer solution can be added to the reaction mixture slowly over time, or yet in another embodiment both the glyoxal and the base polymer solution can be added to the reaction mixture slowly over time. Still other options for reacting glyoxal and base polymer are recognized by those skilled in the art.

The compositions of glyoxalated polyacrylamide polymers according to the present invention can be readily employed or stored for later use in the manufacture of paper as an aqueous solution. The compositions are highly storage stable, even at temperatures exceeding room temperature. As previously indicated, it is not necessary to add stabilizers or other storage-life promoting additives to the high solids polymer compositions according to the present teachings to achieve significantly improved shelf life over conventional 7.5% glyoxalated polyacrylamide polymer formulations. The glyoxalated polyacrylamide polymer compositions according to the present teachings do not need extraneous stabilizers, aldehyde scavengers, and/or surfactants, and the like, to achieve the improvements in storage stability, although these materials are not categorically excluded. In various embodiments, the glyoxalated polyacrylamide polymer compositions of the present teachings can contain no such stabilizer additives or can be essentially free of them (that is, contain <0.1 wt % total stabilizers, aldehyde scavengers, and surfactants).

In various embodiments, the high solids glyoxalated acrylamide polymer compositions of the present teachings have a viscosity of less than about 45 cps (e.g., 1 cps to 24 cps, or 5 cps to 20 cps, or 10 cps to 20 cps), or particularly less than 25 cps, as measured on a Brookfield viscometer using #2 spindle at 60 rpm after 14 days storage at 37° C. In other various embodiments, the high solids glyoxalated acrylamide polymer composition has a viscosity of less than about 25 cps, as measured on a Brookfield viscometer using #2 spindle at 60 rpm (e.g., 1 cps to 24 cps or 5 cps to 20 cps, or 10 cps to 20 cps) after 28 days storage at 37° C. These properties indicate very little if any gelling occurs in the polymer compositions according to the present teachings within at least these storage periods and conditions.

Generally, the glyoxalated polyacrylamide compositions according to the present teachings, such as when intended for use as a paper strengthening agent, can have a solids concentration, for example, from about 1% and about 30%, by weight, or, for example, from about 10% to about 30%, by weight, or, for example, about 11% to about 15%, by weight or, for example, about 12% to about 15%, by weight. As indicated, an advantage of the present teachings is that glyoxalated polyacrylamide polymers synthesized according to various embodiments herein can be stably stored in aqueous compositions at higher polymer concentrations for longer periods of time than conventional glyoxalated polyacrylamide polymer compositions.

In various embodiments, a paper product is provided comprising the glyoxalated polyacrylamide polymer of the present teachings. The product may comprise at least one paper layer or web containing the glyoxalated polyacrylamide polymer, for example, paper sheeting, paperboard, tissue paper, and wall board. The composition is not limited to treating any particular type of paper and should find application in Kraft paper, sulfite paper, semichemical paper, and the like, including paper produced using bleached pulp, unbleached pulp, or combinations thereof.

When using a glyoxalated polyacrylamide composition according to the present teachings in papermaking, it can be added at any time before, during and/or after the paper is formed. The composition is conveniently added at the wet end of a paper-making facility to the dilute cellulose fiber suspensions, normally at a point when wet strength resins are conventionally added. Alternatively, the composition also can be added to a previously prepared paper by padding, spraying, immersing, and/or printing and the like.

The composition can be added to paper pulp over a wide range of pH values. However, best results should be obtained by adding the composition to the paper pulp at a pH of from about 5 to about 8, most preferably from 5.5 to 7.0. Compositions described above are readily absorbed by the cellulose fibers at these pH values.

The amount of added glyoxalated polyacrylamide polymer can be as low as about 0.03 wt % of the dry weight of the cellulose fibers, but usually does not exceed about 10% by weight. An amount in the range of about 0.1 wt % to 5 wt % of the dry paper weight is more usual. The amount of glyoxalated polyacrylamide polymer added, on a solids basis, also can be expressed in terms of from about 0.5 to about 12 pounds (lb.) polymer/ton dry fiber, or, for example, from about 3 to about 10 lb. polymer/ton dry fiber.

The higher charged glyoxalated acrylamide polymer according to the present teachings can give comparable dry and wet strength performances as commercial 7.5% concentration glyoxalated acrylamide products. Significantly improved de-watering for papermaking processes also can be provided with glyoxalated acrylamide polymers according to the present teachings.

The ability to increase glyoxalated acrylamide polymer concentration in aqueous compositions by at least 2% by weight or more according to embodiments of the present teachings as compared to conventional practice, and without impairing storage stability or end-use performance, can translate into huge reductions in aggregate product volumes being transported and handled, such as, for example, where railway tanker car or tanker truck shipments and the like are involved, and thus significant savings in costs and handling can be obtained. The high solids glyoxalated acrylamide polymer compositions according to the present teachings can also tolerate higher storage temperatures than conventional formulations without gelling, reducing the need to further dilute the composition or provide cooling mechanisms to maintain good shelf life at increased storage temperatures.

The present invention will be further clarified by the following examples, which are intended to be purely exemplary of the present invention, in which all percentages, parts, ratios and the like are proportions by weight unless otherwise specified.

EXAMPLES

In these experiments, polyacrylamide base polymers were prepared containing different proportions of acrylamide and cationic monomer contents, and the resulting base polymers were glyoxalated. The resulting glyoxalated base polymers were tested for handsheet dry and wet strengths, water retention/drainage, and storage stability.

Molecular weights of the base polymers were determined in the following manner. Polymer molecular weight was characterized using Waters Breeze System—Gel Permeation Chromatography (GPC). The elution solvent was an aqueous buffer solution containing 0.8 mole/L sodium nitrate and 0.1 mole/L acetic acid. In a typical GPC experiment, concentrated polymer sample was diluted with the elution solvent to give a final concentration of around 0.1%. The diluted polymer solution was injected into the system using a Waters 717plus Autosampler and pumped through a Waters Ultrahydrogel Guard Column followed by a Waters Ultrahydrogel Linear Column. The flow rate was 0.9 ml/min. The molecular weight distribution of the polymer sample was calculated based on a calibration curve determined using poly(ethylene glycol) standard GPC calibration kit from Polysciences.

Example 1

Synthesis of Polyacrylamide Base Polymers

Into a reaction vessel equipped with reflux condenser, stirrer, and thermometer were added with water, sodium formate, and diallyldimethylammonium chloride. This portion of diallyldimethylammonium chloride added in the beginning of the reaction is referred to herein as "DADMAC 1," a 64% by weight aqueous solution of DADMAC. The vessel was then heated to 80° C. and maintained at this temperature. To the vessel were slowly added acrylamide, diallyldimethylammonium chloride, and ammonium persulfate. The addition time of acrylamide and diallyldimethylammonium chloride was 190 minutes and the addition time of ammonium persulfate was 220 minutes. The acrylamide was a 50% by weight aqueous solution. The portion of diallyldimethylammonium chloride added over this 190 minute addition period is referred to herein as "DADMAC 2," also a 64 wt % aqueous solution of DADMAC. The reaction mixture was then heated at 80° C. for an additional one hour and was then cooled. Table 1 listed the addition dosages of all the compounds used in synthesizing the base polymers.

TABLE 1

Base polymer preparation dosages.

|  | Water (g) | Sodium formate (g) | DADMAC 1 (g) | Acrylamide (g) | DADMAC 2 (g) | Ammonium persulfate (g) | Total DADMAC (wt %) | Weight average molecular weight (Da) |
|---|---|---|---|---|---|---|---|---|
| Base polymer1 | 124.0 | 11.2 | 16 | 468 | 24 | 12.5 (25% in water) | 9.7 | 7200 |
| Base polymer2 | 62.3 | 5.4 | 16 | 208 | 24 | 8.1 (20% in water) | 20 | 7200 |
| Base polymer3 | 62.3 | 5.4 | 16 | 181.5 | 36 | 8.1 (20% in water) | 30 | 7300 |
| Base polymer4 | 74 | 5.4 | 16 | 155 | 65 | 8.1 (20% in water) | 40 | 7400 |
| Base polymer5 | 84.7 | 4.3 | 16 | 116 | 95 | 7.15 (23% in water) | 55 | 7600 |

Example 2

Glyoxalation

The glyoxalation of the base polymers of Example 1 was conducted in the following manner. Into a reaction vessel were added water, base polymer, and sodium pyrophosphate. After 15 minutes of mixing, the pH of the reaction mixture was increased to 8.8 using 15% NaOH solution and the temperature of the mixture was maintained at 25° C. Once the viscosity of the mixture reached 15 cp, dilution water was added and solution pH was then lowered to 3.0 immediately using 25% $H_2SO_4$. The products were stored at 4° C. until further testing. Table 2 lists the dosages of all the compounds for glyoxalation. The products of these reactions were aqueous compositions containing the glyoxalated polyacrylamide polymers as active content therein.

TABLE 2

Glyoxalation dosages.

| Product | Water (g) | Base polymer (g) | Glyoxal (40%) (g) | Sodium Pyrophosphate (g) | Dilution water | Final active content (wt %) |
|---|---|---|---|---|---|---|
| G-PAM1 | 370 | 80 (Base polymer1) | 18 | 3.5 | 45 | 7.5% |
| G-PAM1a | 124 | 47 (Base polymer1) | 10.4 | 1.5 | 17 | 11.5% |
| G-PAM2 | 124 | 47 (Base polymer2) | 10.4 | 1.5 | 17 | 11.5% |
| G-PAM3 | 124 | 47 (Base polymer3) | 10.4 | 1.5 | 17 | 11.5% |
| G-PAM4 | 124 | 47 (Base polymer4) | 10.4 | 1.5 | 17 | 11.5% |
| G-PAM5 | 117.5 | 57 (Base polymer5) | 15.4 | 1.6 | 27 | 13.3% |

Example 3

Paper handsheet preparations and tests were conducted with the glyoxalated polymer products of Example 2 as follows.

Handsheet Preparation.

Pulp stock was post-refining recycled old corrugated cardboard (OCC) obtained from National Gypsum Company Pryor Papermaking Mill. All handsheets were prepared essentially according to Tappi standard method T205, with the following modifications. (1) 1 wt % G-PAM solution was added to 0.5 wt % OCC suspension under shearing. (2) Four three-gram handsheets were prepared in a standard handsheet mould. (3) After two wet presses, the handsheets were dried for 15 minutes in an Emerson Speed Drier (Model 130) at 105° C. 4 kg weight was kept on the drier during the drying process. (4) The obtained handsheets were conditioned in a constant humidity room (50% humidity, 23° C.) for 15 hours before testing. The dosage of the glyoxalated polyacrylamide resins was 6 lb. polymer/ton dry fiber.

Handsheet Physical Property Tests.

Dry tensile strength tests and ring crush strength tests were carried out based on Tappi standard methods T494 and T818 respectively. For the wet tensile tests, each sample was cut to be one inch in width. After soaking in de-ionized water for 60 seconds, the sample was pulled at 1 in/min rate and the load at the failure was recorded.

Figure 2:
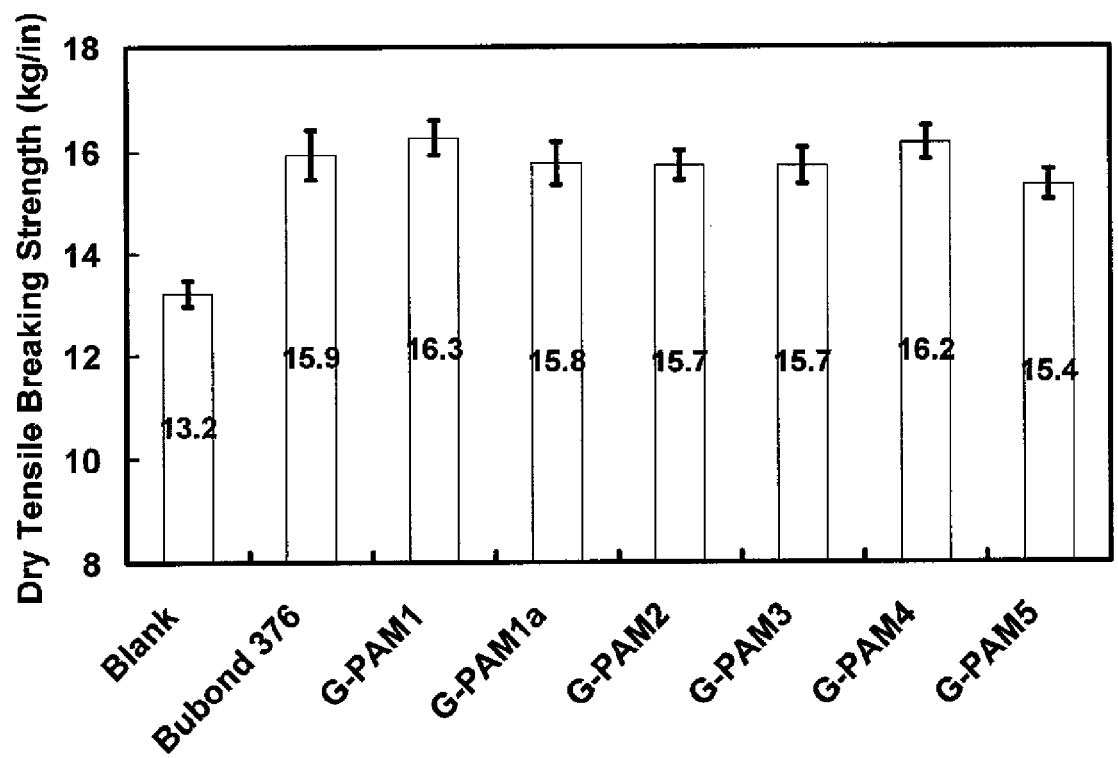
FIG. 2 illustrates the results of a handsheet dry tensile breaking strength test conducted on handsheets treated with different glyoxalated polyacrylamide compositions containing different proportions of cationic monomer content in the base polymer and/or active content.
Figure 3:
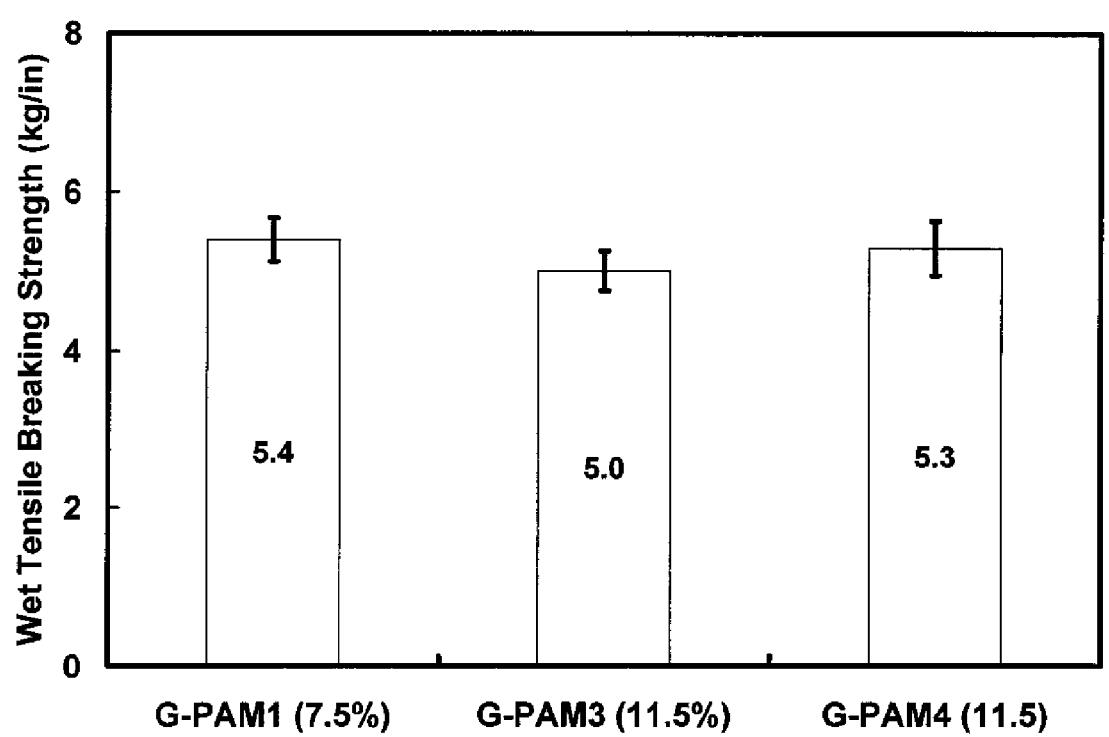
FIG. 3 illustrates the results of a handsheet wet tensile breaking strength test conducted on handsheets treated with different glyoxalated polyacrylamide compositions containing different proportions of cationic monomer content in the base polymer and/or active content.

FIG. 1, FIG. 2 and FIG. 3 show the ring crush, dry tensile and wet tensile strength testing results of the glyoxalated polyacrylamide (G-PAM) products. BUBOND® 376 was a commercial G-PAM product with an active content of 7.5%. It is clear from these results that high solid G-PAM products G-PAM3 and G-PAM-4 gave comparable dry and wet strength as the commercial or commercially-representative 7.5% concentration products of BUBOND® 376 and G-PAM 1.

Glyoxalated Polyacrylamide Stability Test.

Figure 4:
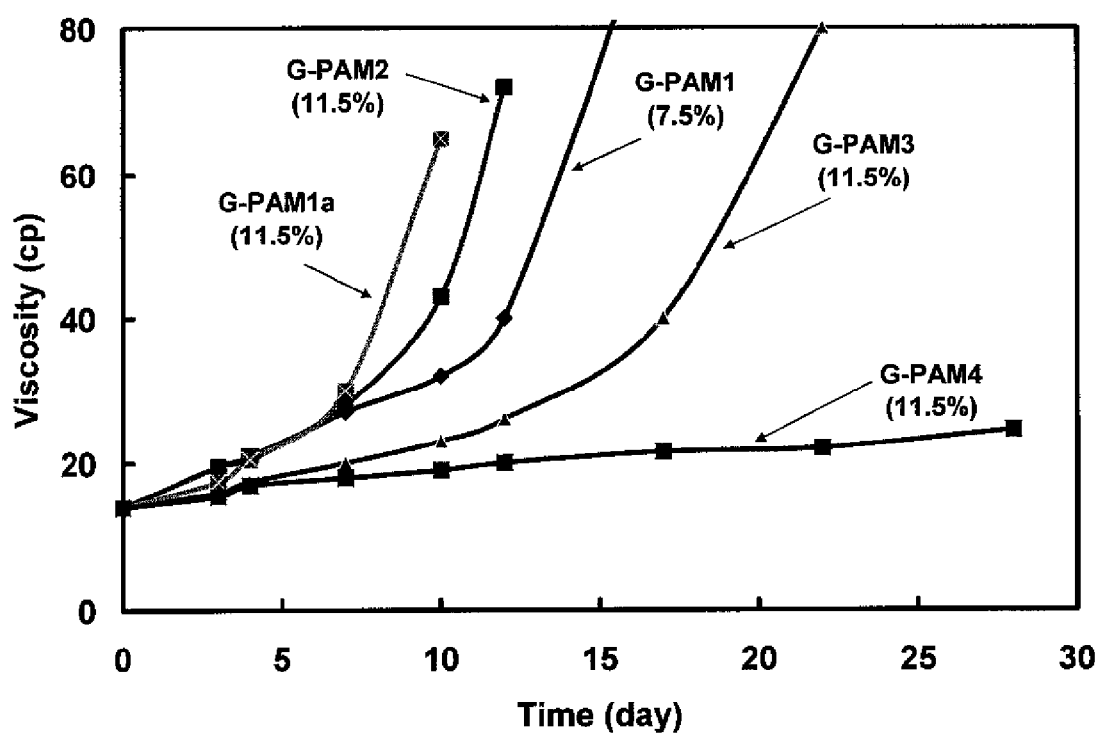
FIG. 4 illustrates the results of storage stability tests conducted on compositions containing different proportions of cationic monomer content in the base polymer and/or active content, wherein the results are shown as viscosity profiles of products as a function of storage time in days at 37° C.

The glyoxalated polyacrylamide products were placed in an oven maintained at 37° C. From time to time, these products were taken out from the oven and their viscosities at room temperature were determined with a Brookfield viscometer using #2 spindle at 60 rpm. After taking the viscosity measurement, the samples were returned to the oven for further storage. A lower viscosity increase rate suggests a longer shelf life. FIG. 4 shows their viscosity profiles over time. Both G-PAM3 and G-PAM4 had significantly lower viscosity increase rates than 7.5% G-PAM1. Further, significant improvements in resistance to viscosity increase, and thus gelation, are seen occurring between G-PAM3 (11.5%) as compared to G-PAM2 (11.5%), where the base polymer used in G-PAM3 contained 30% by weight DADMAC as compared to 20% by weight for the base polymer of G-PAM2. In addition, G-PAM4, which had 40% by weight DADMAC content in the base polymer, gave the best de-watering performance, wherein the viscosity increase was very small (i.e., less than approximately 7 cps) after 28 days of storage at 37° C. This indicated that very little or no gelation had occurred in G-PAM4.

OCC Suspension De-Watering Test.

Figure 5:
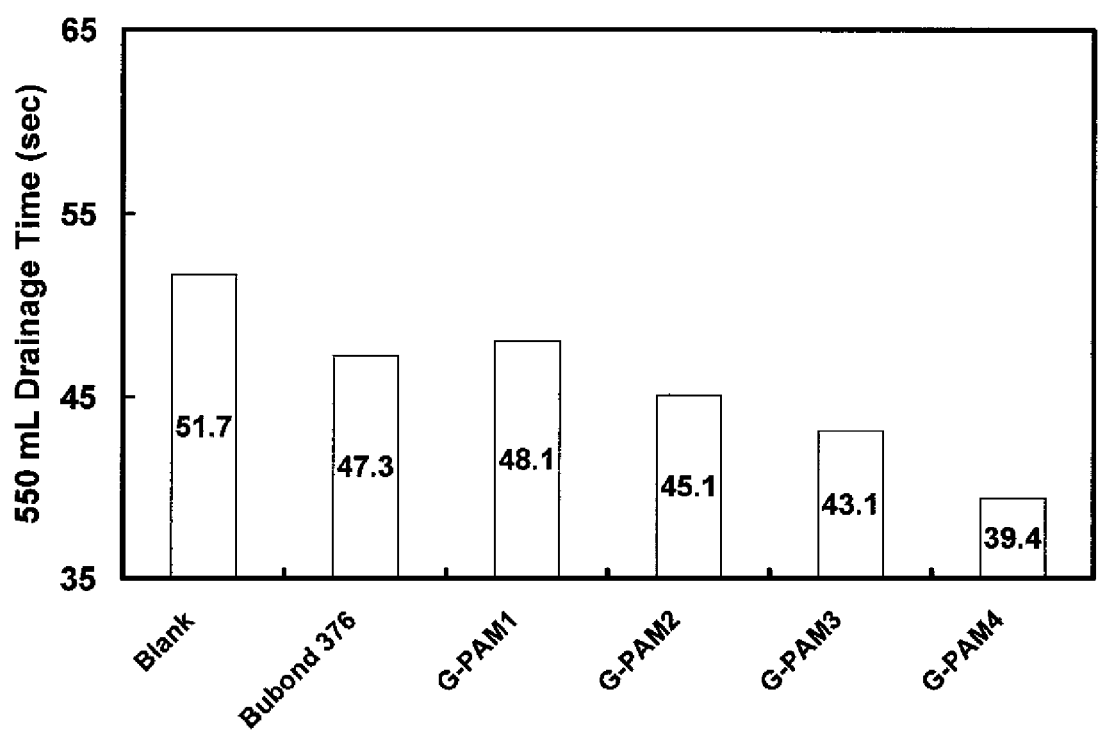
FIG. 5 illustrates the results of de-watering tests conducted on compositions containing different proportions of cationic monomer content in the base polymer and/or active content, wherein the results are shown for post-refining recycled old corrugated cardboard (OCC) suspension drainage time determined using a Mutek DFR-4 drainage/retention tester.

In this test the effect of glyoxalated polyacrylamide on OCC (old corrugated containers) suspension de-watering rate was studied. A faster de-watering process indicates a higher production rate and lower energy consumption during paper drying process. 1000 mL 1.0% OCC suspension was added to a Mutek DFR-4 drainage/retention tester and was then sheared at 550 rpm for five seconds. 1% glyoxalated polyacrylamide solution was then added to the suspension and the suspension was mixed at 550 rpm for an additional five seconds. The dosage of the glyoxalated polyacrylamide resins was 7 lb. polymer/ton dry fiber. The mixing was then stopped and the time of draining 550 mL water through a 60 mesh wire was recorded. As shown in FIG. 5, a higher DADMAC content in the base polymer led to a higher de-watering rate. Significant improvements in de-watering performance are seen for G-PAM3, which had 30% by weight DADMAC content in the base polymer, and especially with G-PAM4, which had 40% by weight DADMAC content in the base polymer, in comparison to the other tested materials. G-PAM4 in particular gave the best de-watering performance among the tested materials.

Example 4

Paper hand sheet preparations and ring crush strength tests were conducted using glyoxalated polymer products including G-PAM4 of Example 2 and additional products G-PAM6 and G-PAM7 prepared similarly as the G-PAM products of Examples 1-2 with differences in ingredient amounts and resulting molecular weights as indicated in Tables 3-4. OCC handsheets were prepared with these G-PAM products in a similar manner as explained in Example 3. The results of the ring crush strength tests are indicated in Table 5.

7.5% concentration products over a range of different base polymer values of the G-PAM products.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A glyoxalated polyacrylamide polymer composition comprising a glyoxalated polyacrylamide polymer in an amount of from 11.5% to about 30% by weight of said composition, and comprising an aqueous medium, wherein said glyoxalated polyacrylamide polymer is obtained from the reaction between glyoxal and a cationic polyacrylamide base polymer comprising at least about 25% by weight cationic monomer, wherein the cationic polyacrylamide base polymer has a molecular weight ranging from about 3,000 Daltons to about 13,000 Daltons, and wherein the cationic polyacrylamide base polymer comprises from about 70% to about 50%, by weight, acrylamide monomer and from about 30% to about 50%, by weight, cationic monomer copolymerizable with said acrylamide monomer, wherein the glyoxalated polyacrylamide polymer composition has a viscosity of less than about 45 cps, as measured on a Brookfield viscometer using #2 spindle at 60 rpm after 14 days storage at 37° C.

TABLE 3

Base polymer preparation dosages.

| | Water (g) | Sodium formate (g) | DADMAC 1 (g) | Acrylamide (g) | DADMAC 2 (g) | Ammonium persulfate (g) | Total DADMAC (wt %) | Weight average molecular weight (Da) |
|---|---|---|---|---|---|---|---|---|
| Base polymer4 | 74 | 5.4 | 16 | 155 | 65 | 8.1 (20% in water) | 40 | 7400 |
| Base polymer6 | 74 | 7 | 16 | 155 | 65 | 8.1 (20% in water) | 40 | 5500 |
| Base polymer7 | 74 | 4.3 | 16 | 155 | 65 | 8.1 (20% in water) | 40 | 9000 |

TABLE 4

Glyoxalation dosages.

| Product | Water (g) | Base polymer (g) | Glyoxal (40%) (g) | Sodium Pyrophosphate (g) | Dilution water | Final active content (wt %) |
|---|---|---|---|---|---|---|
| G-PAM4 | 124 | 47 (Base polymer4) | 10.4 | 1.5 | 17 | 11.5% |
| G-PAM6 | 124 | 47 (Base polymer6) | 10.4 | 1.5 | 17 | 11.5% |
| G-PAM7 | 124 | 47 (Base polymer7) | 10.4 | 1.5 | 17 | 11.5% |

TABLE 5

Ring Crush Strength.

| Product | Dosage | Ring Crush Strength (lb/in) |
|---|---|---|
| G-PAM4 | 6 lb/ton | 52.6 ± 0.6 |
| G-PAM6 | 6 lb/ton | 52.9 ± 1.6 |
| G-PAM7 | 6 lb/ton | 50.4 ± 2.1 |

It is clear from these results when considered together with those of Example 3 that high solid G-PAM products representative of embodiments of the present invention, such as G-PAM4, G-PAM6 and G-PAM7, can give comparable strength as the commercial or commercially-representative 2. The glyoxalated polyacrylamide polymer composition according to claim 1 having sufficient glyoxal-reactive amide substituents and —CHOHCHO substituents to be thermosetting.

3. The glyoxalated polyacrylamide polymer composition according to claim 2, comprising 11.5% to about 15%, by weight, glyoxalated polyacrylamide polymer.

4. The glyoxalated polyacrylamide polymer composition according to claim 2, wherein said polymer composition is essentially free of stabilizers, aldehyde scavengers, and surfactants.

5. The glyoxalated polyacrylamide polymer composition according to claim 2, having a viscosity of less than about 25 cps, as measured on a Brookfield viscometer using #2 spindle at 60 rpm after 14 days storage at 37° C.

6. The glyoxalated polyacrylamide polymer composition according to claim 2, having a viscosity of less than about 25 cps, as measured on a Brookfield viscometer using #2 spindle at 60 rpm after 28 days storage at 37° C.

7. The glyoxalated polyacrylamide polymer composition according to claim 2, wherein the polyacrylamide base polymer comprises from about 62% to about 55%, by weight, acrylamide monomer, and from about 38% to 45%, by weight, cationic monomer copolymerizable with said acrylamide.

8. The glyoxalated polyacrylamide polymer composition according to claim 2, wherein the polymer is a reaction product of glyoxal and a base polymer comprising the acrylamide monomer and the cationic monomer in a weight ratio ranging from about 0.01 to 0.6:1.

9. The glyoxalated polyacrylamide polymer composition according to claim 2, wherein the cationic monomer is 2-vinylpyridine, 2-vinyl-N-methylpyridinium chloride, (p-vinylphenyl)trimethyl ammonium chloride, diallyldimethylammonium chloride, 2-(dimethylamino)ethyl acrylate, trimethyl(p-vinylbenzyl)ammonium chloride, p-dimethylaminoethylstyrene, dimethylaminopropyl acrylamide, 2-methylacroyloxyethyltrimethyl ammonium methylsulfate, or 3-acrylamido-3-methylbutyl trimethyl ammonium chloride, or any combination thereof.

10. The glyoxalated polyacrylamide polymer composition according to claim 9, wherein the cationic monomer is diallyldimethylammonium chloride.

11. The glyoxalated polyacrylamide polymer composition according to claim 9, wherein the acrylamide monomer is acrylamide, methacrylamide, ethylacrylamide, crotonamide, N-methyl acrylamide, N-butyl acrylamide, or N-ethyl methacrylamide, or any combination thereof.

12. The glyoxalated polyacrylamide polymer composition according to claim 2, wherein the cationic polyacrylamide base polymer comprises from about 70% to about 55%, by weight, acrylamide monomer and from about 30% to 45%, by weight, cationic monomer copolymerizable with said acrylamide monomer.

13. A paper product comprising recycled paper pulped with the glyoxalated polyacrylamide polymer of said glyoxalated polyacrylamide polymer composition of claim 1 in an amount effective to provide a water drainage rate of less than about 45 seconds for drainage of 550 mL through 60 mesh wire with a Mutek DFR-4 tester using a dosage of 7 pounds glyoxalated acrylamide polymer per ton dry fiber, wherein the glyoxalated acrylamide polymer comprises from about 70% to about 50%, by weight, acrylamide monomer and from about 30% to about 50%, by weight, cationic monomer copolymerizable with said acrylamide monomer, and having sufficient glyoxal-reactive amide substituents and —CHOHCHO substituents to be thermosetting.

14. A process of making paper which comprises adding said glyoxalated polyacrylamide polymer composition of claim 1 to cellulose papermaking fibers in aqueous suspension and absorbing an amount of the glyoxalated polyacrylamide polymer of said glyoxalated polyacrylamide polymer composition on said cellulose papermaking fibers in aqueous suspension, forming said suspension into a water-laid web and drying said web, wherein the amount of glyoxalated polyacrylamide polymer is effective to increase at least one paper property selected from dry strength, wet strength, or de-water rate as compared to paper made with the suspension absent the glyoxalated polyacrylamide polymer.

15. A process of making paper according to claim 14, wherein glyoxalated acrylamide polymer of said glyoxalated polyacrylamide polymer composition has been stored for at least about 28 days at about 25° C. prior to said absorbing step.

16. A process of making paper according to claim 14, wherein glyoxalated acrylamide polymer of said glyoxalated polyacrylamide polymer composition has been stored for at least about 14 days at about 37° C. prior to said absorbing step.

17. A process of making paper according to claim 14, wherein glyoxalated acrylamide polymer of said glyoxalated polyacrylamide polymer composition has been stored for at least about 28 days at about 37° C. prior to said absorbing step.

18. A process of making paper according to claim 14, wherein the paper comprises from about 0.5 to about 12 pounds polymer/ton dry fiber.

19. A process of making paper according to claim 14, wherein the paper comprises a cellulosic fibrous non-woven web.

20. A process of making paper according to claim 14, wherein said polymer is introduced via an aqueous composition that is essentially free of stabilizers, aldehyde scavengers, and surfactants.

21. A process for making the glyoxalated polyacrylamide polymer composition of claim 1 by copolymerizing from about 70% to about 50%, by weight, acrylamide monomer and from about 30% to about 50%, by weight, cationic monomer copolymerizable with said acrylamide monomer to form a base polymer, and glyoxalating the base polymer with sufficient glyoxal-reactive amide substituents and —CHOHCHO substituents to be thermosetting, to provide said glyoxalated polyacrylamide polymer.

22. A process for making a polymer composition according to claim 21, wherein said polymer composition is essentially free of stabilizers, aldehyde scavengers, and surfactants.

* * * * *